US008666829B1

(12) United States Patent
Bruckhaus

(10) Patent No.: US 8,666,829 B1
(45) Date of Patent: Mar. 4, 2014

(54) DETECTING FRAUDULENT EVENT LISTINGS

(75) Inventor: Tilmann Bruckhaus, Cupertino, CA (US)

(73) Assignee: Eventbrite, Inc., San Francisco, CA (US)

( * ) Notice: Subject to any disclaimer, the term of this patent is extended or adjusted under 35 U.S.C. 154(b) by 281 days.

(21) Appl. No.: 12/966,104

(22) Filed: Dec. 13, 2010

(51) Int. Cl.
*G06Q 30/00* (2012.01)

(52) U.S. Cl.
USPC ........................................ 705/26.1; 705/27.1

(58) Field of Classification Search
USPC ............................... 705/26.1, 27.1
See application file for complete search history.

(56) References Cited

U.S. PATENT DOCUMENTS

| | | | |
|---|---|---|---|
| 7,403,922 B1 | 7/2008 | Lewis et al. | |
| 7,527,195 B2 * | 5/2009 | Keithley et al. | 235/380 |
| 7,610,216 B1 | 10/2009 | May et al. | |
| 7,657,497 B2 | 2/2010 | Nandy | |
| 2007/0129999 A1 | 6/2007 | Zhou et al. | |
| 2007/0168277 A1 * | 7/2007 | Marchesi | 705/38 |
| 2010/0094791 A1 * | 4/2010 | Miltonberger | 706/46 |
| 2010/0293090 A1 * | 11/2010 | Domenikos et al. | 705/38 |
| 2011/0173116 A1 * | 7/2011 | Yan et al. | 705/38 |
| 2012/0197749 A1 * | 8/2012 | Gray | 705/26.3 |
| 2012/0203698 A1 * | 8/2012 | Duncan et al. | 705/44 |

OTHER PUBLICATIONS

Using Key Performance Indicators and Risk Measures in Continuous Monitoring, Nigrini, Mark J, ; Johnson, Arlo J. Journal of Emerging Technologies in Accounting (2008): 65-80, downloaded from ProQuestDirect on the Internet on Mar. 10, 2013, 6 pages.*
Giesen, Lauri. Online shopping: How will consumers pay? Financial Service Online 4.9 (Oct. 1999): 38. Downloaded from ProQuestDirect on the Internet on Oct. 8, 2013, 5 pages.*

* cited by examiner

*Primary Examiner* — James Zurita
(74) *Attorney, Agent, or Firm* — Baker Botts L.L.P.

(57) ABSTRACT

In one embodiment, a method includes accessing event information and payment information associated with an event listing on an event management system, and calculating a fraud risk score for the event listing based at least in part on the event information and payment information.

17 Claims, 4 Drawing Sheets

US 8,666,829 B1

DETECTING FRAUDULENT EVENT LISTINGS

TECHNICAL FIELD

The present disclosure generally relates to online event management systems and fraud detection systems.

BACKGROUND

Many websites allow users to conduct a variety of actions online, such as view content, write reviews, order items, purchase tickets, etc. These websites often present the user with a plurality of actions to choose from and allow the user to select the type of action he would like to perform. Once the action is selected, the website typically redirects the client system of the user to a webpage where the action can be completed. For example, some websites allow users to organize events using an online event management system. An online event management system may allow an event organizer to organize and manage various aspects of an event, such as, for example, managing attendee registrations and selling tickets, promoting the event, and managing attendee check-in at the event. An online event management system may also allow users to view event listings, register for events, and purchase tickets for events. Online systems, such as online event management systems, can typically be accessed using suitable browser clients (e.g., Firefox, Chrome, Internet Explorer).

Some users of an online event management system may attempt to improperly use the system, such as by violating the terms of services of the system or by using the system to commit illegal acts. One type of improper use is creating event listings that contain spam or other improper advertisements. For example, a user may create an online event listing for a fake event and then use the event listing to display an advertisement for a product (e.g., erectile dysfunction drugs, nutraceuticals, pornography). Another type of improper use is creating event listings in order to make fraudulent financial transactions. For example, a user may create an online event listing for a fake event. The user, and possibly one or more accomplices, may then use stolen credit cards to purchase tickets to the fake event. The user may then request that the system pay out money to the user for the fraudulently purchased tickets. If the online event management system pays out the money before the purchases can be verified (such as, for example, by a credit card processor, a credit card issuer, or a fraud detection system) the system may lose money when the fraudulent purchases are declined by the credit card processor.

DESCRIPTION OF EXAMPLE EMBODIMENTS

System Overview

Figure 1:
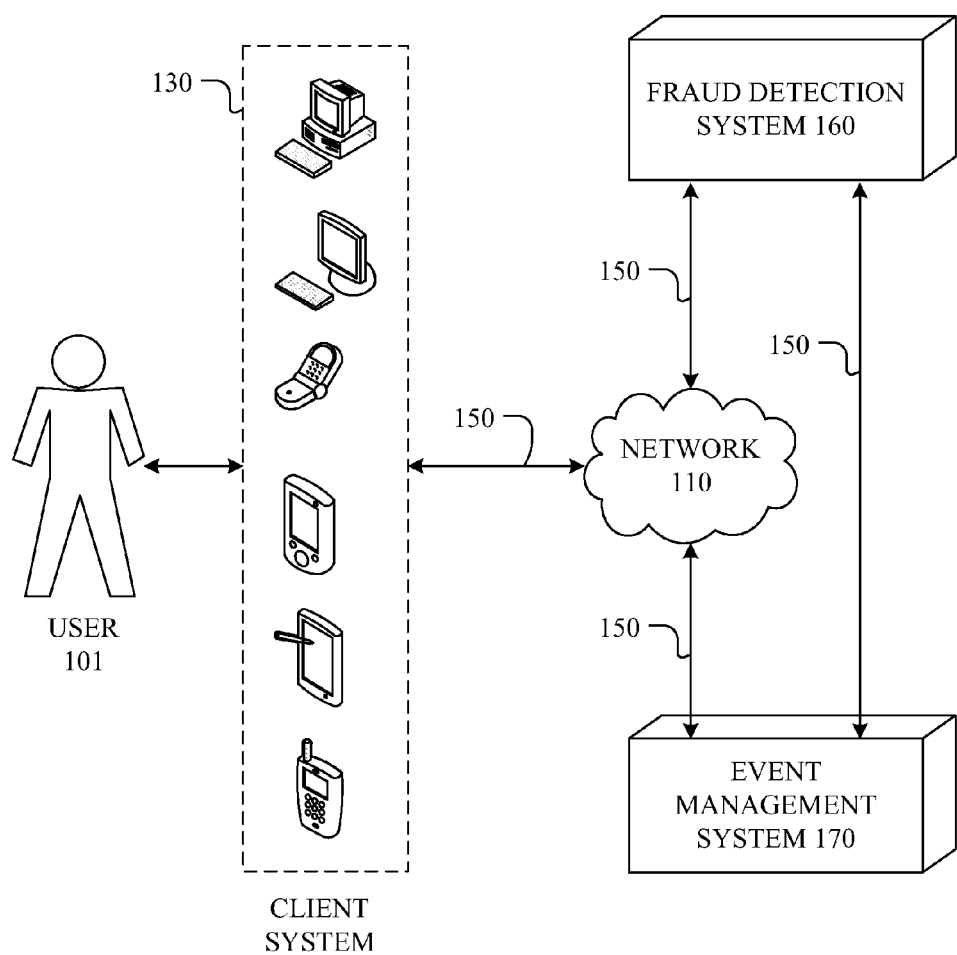
FIG. 1 illustrates an example system for implementing an online event management system and an online fraud detection system.

FIG. 1 illustrates an example system 100 for implementing an online event management system and a fraud detection system. System 100 includes a user 101, a client system 130, a fraud detection system 160, and an event management system 170 connected to each other by a network 110. Although FIG. 1 illustrates a particular arrangement of user 101, client system 130, fraud detection system 160, event management system 170, and network 110, this disclosure contemplates any suitable arrangement of user 101, client system 130, fraud detection system 160, event management system 170, and network 110. As an example and not by way of limitation, two or more of client system 130, fraud detection system 160, and event management system 170 may be connected to each other directly, bypassing network 110. As another example and not by way of limitation, two or more of client system 130, fraud detection system 160, and event management system 170 may be physically or logically co-located with each other in whole or in part. As yet another example, one or more fraud detection systems 160 may be physically or logically co-located with one or more event management systems 170 in whole or in part. Moreover, although FIG. 1 illustrates a particular number of users 101, client system 130, fraud detection systems 160, event management systems 170, and networks 110, this disclosure contemplates any suitable number of users 101, client systems 130, fraud detection systems 160, event management systems 170, and networks 110. As an example and not by way of limitation, system 100 may include multiple users 101, client systems 130, fraud detection systems 160, event management systems 170, and networks 110.

In particular embodiments, an event management system 170 may be a network-addressable computing system that can host one or more event organization and management systems. An event management system 170 may generate, store, receive, and transmit event-related data, such as, for example, event listings, event details, event history details, event registration details, event organizer details, event attendee details, ticket purchase details, and event displays. An event management system 170 may be accessed by the other components of system 100 either directly or via network 110. In particular embodiments, fraud detection system 160 may be a network-addressable computing system that can host one or more event fraud detection engines. Fraud detection system 160 may generate, store, receive, and transmit event fraud-related information, such as, for example, event-related data, credit card processor information, and fraud risk scores. Fraud detection system 160 may be accessed by the other components of system 100 either directly or via network 110. Fraud detection system 160 may be an independent system or a subsystem of event management system 170. In particular embodiments, one or more users 101 may use one or more client systems 130 to access, send data to, and receive data from an event management system 170. A client system 130 may access an event management system 170 directly, via network 110, or via a third-party system. A client system 130 may be any suitable computing device, such as, for example, a personal computer, a laptop, a cellular phone, a smart phone, or a computing tablet. In particular embodiments, one or more users 101 may be an automated system, such as, for example, a computer program, an internet bot, a computer virus, malware, another type of automated system, or two or more such systems.

Network 110 may be any suitable communications network. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Connections 150 may connect client system 130, fraud detection system 160, and event management system 170 to communication network 110 or to each other. This disclosure contemplates any suitable connections 150. In particular embodiments, one or more connections 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)) or optical (such as for example Synchronous Optical Network (SONET) or Synchronous Digital Hierarchy (SDH)) connections. In particular embodiments, one or more connections 150 each include an ad hoc network, an intranet, an extranet, a VPN, a LAN, a WLAN, a WAN, a WWAN, a MAN, a portion of the Internet, a portion of the PSTN, a cellular telephone network, another connection 150, or a combination of two or more such connections 150. Connections 150 need not necessarily be the same throughout system 100. One or more first connections 150 may differ in one or more respects from one or more second connections 150.

Event Management Systems

In particular embodiments, an event management system 170 may allow users to organize and manage events. An event may be, for example, a party, a concert, a conference, a sporting event, a fundraiser, a networking event, or a live performance. Events may occur online (such as, for example, a web-based seminar) and offline (such as, for example, a live seminar in a lecture hall). An online event management system may allow an event organizer to organize and manage various aspects of an event, such as, for example, managing attendee registrations and selling tickets, managing funds from ticket sales, promoting the event, and managing attendee check-in at the event. An online event management system may also allow event attendees to view and manage various aspects of registering for an event, such as, for example, viewing event listings, viewing event information, viewing event history information, registering for events, and purchasing tickets for events. As an example and not by way of limitation, a first user may use event management system 170 to organize an event. The first user may input event information associated with the event. One or more second users may then use event management system 170 to register for the event. The second users may view an event listing associated with the event and then purchase tickets for the event. Although this disclosure describes particular types of events, this disclosure contemplates any suitable types of events. Moreover, although this disclosure describes organizing and managing particular aspects of an event, this disclosure contemplates organizing and managing any suitable aspects of an event.

In particular embodiments, each event that event management system 170 is managing has an associated event listing. An event listing may be accessed and displayed by any suitable client system 130. An event listing may have an event information associated with the event listing. Event information may include information describing the event date, type, cost, organizer, promoter, geographic location, venue, performer, attendees, and other suitable event information. Although this disclosure describes particular types of event information, this disclosure contemplates any suitable types of event information. An event listing may also have a payment information associated with the event listing. Payment information may include the address verification system code for the payments for the event, the credit cards used to pay for the event, the decline rate for the credit cards, the use ratio of the credit cards, the locations of payers, the IP addresses of the payers, the use ratio of the IP addresses, the number of prior payouts to the event organizer, the amount of prior payouts to the event organizer, and other suitable payment information. Although this disclosure describes particular types of payment information, this disclosure contemplates any suitable types of payment information.

In particular embodiments, each user 101 of event management system 170 may have an event history information associated with the user 101. Event history information may include event information and payment information associated with one or more events a user 101 has attended or has registered to attend, as well as purchase history information associated with the event. Event history information may also include event information and payment information associated with one or more event listings a user 101 has created, organized, and managed. Although this disclosure describes particular event history information, this disclosure contemplates any suitable event history information.

In particular embodiments, the event management system 170 may use unique client identifiers to identify a user 101. As an example and not by way of limitation, the event management system 170 may assign a unique client identifier to each client system 130. The event management system 170 may assign each client system 130 with an unique client identifier based on the IP address of the client system 130, tracking cookies on the client system 130 (which may be appended to HTTP requests transmitted by the client system 130), the serial number or asset tag of the client system 130, or other suitable identifying information. As another example and not by way of limitation, the event management system 170 may assign a unique client identifier to each user 101, which the user must provide to the event management system 170 via a client system 130. The event management system 170 may assign each user 101 with a username and password that the user 101 can input into client system 130, which then transmits the username and password to the event management system 170. In particular embodiments, the event management system 170 can use the unique client identifier to determine that the user 101 is accessing the system.

In particular embodiments, the event management system 170 may maintain an event management account for a user 101. The event management account may contain a variety of information about the user 101. As an example and not by way of limitation, an event management account may contain personal information (such as, for example, name, sex, location, and interests), social network information (such as, for example, friend connections), financial information (such as, for example, income and credit history), event history information (such as, for example, the type, data, cost, venue, performers, and geographic location of the events a user 101 has organize, registered for, or attended), and other suitable information related to the user 101. The event management account may also contain information related to the funds collected by event management system 170 from ticket sales for event listings created by the user 101, and information related to funds paid out to the user 101. Although this disclosure describes event management accounts containing particular types of information about a user 101, this disclosure contemplates event management accounts containing any suitable information about a user 101.

In particular embodiments, an event management system 170 may use a "shopping cart" model to facilitate event registration. As an example and not by way of limitation, event management system 170 may present a user 101 with a plurality of event listings. The user 101 may select one or more of the events to register for. When the user 101 selects an event listing on event management system 170, the event management system 170 metaphorically adds that item to a shopping cart. When the user 101 is done selecting event listings, then all the items in the shopping cart may be "checked out" (i.e., ordered) when the user 101 provides billing information (and possibly shipment information). Billing information may include the user 101's name, address, credit card information, bank account number, PayPal username, and other suitable billing or payment information. In some embodiments, when a user 101 selects an event listing, then that event listing is "checked out" by automatically prompting the user for the billing and shipment information. The user 101 then may be presented with a registration webpage that prompts the user for the user-specific registration information to complete the registration. That webpage may be prefilled with information that was provided by the user 101 when registering for another event or when establishing a user account on event management system 170. The information may then be validated by event management system 170, and the registration may be completed. At this point, the user 101 may be presented with a registration confirmation webpage that displays the details of the event and registration details. Event management system 170 may also charge or withdraw funds from a financial account associated with user 101 based on the billing information provided by the user 101. Although this disclosure describes particular means for registering for events and purchasing tickets, this disclosure contemplates any suitable means for registering for events and purchasing tickets.

In particular embodiments, an event management system 170 may facilitate paying out funds to an event organizer. The event management system 170 may collect funds from ticket buyers, hold these funds, and transfer some or all of the funds to the event organizer. In particular embodiments, one or more users 101 may buy one or more tickets on event management system 170, and the system may collect some or all of the funds associated with these ticket sales. As an example and not by way of limitation, nine users 101 may purchase tickets to a concert using event management system 170. If the tickets cost $100 each, then event management system 170 would have collected $900 from the users 101. In particular embodiments, event management system 170 may then pay out funds from ticket sales to an event organizer. As an example and not by way of limitation, event management system 170 may transfer or deposit the funds into a financial account associated with the event organizer. Event management system 170 may pay out some or all of the funds. For example, if each $100 ticket includes an $8 service charge, event management system 170 may only pay out $92 per ticket to the event organizer. In particular embodiments, event management system 170 may pay out funds to the event organizer at particular times. As an example and not by way of limitation, event management system 170 may pay out funds to an event organizer after each ticket sale. As another example and not by way of limitation, event management system 170 may pay out funds in response to a request from the event organizer. The event organizer may request to withdraw all funds from his account. Alternatively, the event organize may request to withdraw less than all the funds. For example, if event management system 170 has collected $900 from selling tickets, the event organizer may request that the system pay out only $700. In particular embodiments, event management system 170 may hold funds for a particular time period. Event management system 170 may hold these funds for a time sufficient to allow payments to clear or be verified. Payments may be verified or cleared by a bank, a credit card issuer, a credit card processor, or a fraud detection system 160. If the funds used to purchase a ticket have not yet cleared, event management system 170 may hold the funds and not allow these funds to be paid out. Although this disclosure describes a particular means for paying out funds to an event organizer, this disclosure contemplates any suitable means for paying out funds to an event organizer.

Fraud Detection Systems

In particular embodiments, a fraud detection system 160 may evaluate one or more event listings for potential or actual fraud. Fraud detection system 160 may be an independent system or a subsystem of event management system 170. Fraud detection system 160 may access event listings and associated event information and payment information on event management system 170 and analyze the event listings for improper, fraudulent, or illegal use. Although this disclosure describes particular methods for evaluating event listings for fraud, this disclosure contemplates any suitable methods for evaluating event listings for fraud.

In particular embodiments, an event listing may be evaluated for fraud by calculating a fraud risk score for the event listings. A fraud risk score may represent the probability an event listing is fraudulent, the percentile rank of the risk of fraud associated with the event listing in relation to other event listings, or other suitable scoring representations. As an example and not by way of limitation, fraud detection system 160 may analyze a set of event listings for fraud and calculate a preliminary fraud value associated with the risk of fraud for each event listing. Fraud detection system 160 may then sort the event listings by preliminary fraud value and calculate a percentile rank associate with each event listing or preliminary fraud value. The percentile ranks may then be used as the fraud risk scores for the event listings. As another example and not by way of limitation, fraud detection system 160 may analyze a set of event listing and determine the mean or nominal values for particular types of event information and payment information. Fraud detection system 160 may then calculate the deviation of each event listing from these mean or nominal values, such that event listings with more or larger deviations may have higher fraud risk scores than event listings with fewer or smaller deviations. For example, if the nominal value for an event location is "United States," then event listings with event locations of "Nigeria" may have high fraud risk scores than event listings with event locations of "United States." As another example, if the mean credit card decline rate for ticket purchases is 12% with a standard deviation of ±4%, then an event listing with a credit card decline rate of 40% may have a high fraud risk score. Although this disclosure describes using particular methods for scoring the risk of fraud associated with an event listing, this disclosure contemplates using any suitable methods for scoring the risk of fraud associated with an event listing.

Fraud detection system 160 may calculate a fraud risk score for an event listing based on a variety of factors, such as, for example, event information associated with the event listings, payment information associated with the event listing, the amount of funds to be paid out to the event organizer, other suitable event or payment information, or two or more such factors. The following is an example algorithm that fraud detection system 160 could use to calculate a fraud risk score:

$$f_{fraud} = f(E_1, \ldots, E_n, P_1, \ldots, P_m, R)$$

where:

$f_{fraud}$ is the fraud risk score, $E_1, \ldots, E_n$ are event information 1 through n, $P_1, \ldots, P_m$ are payment information 1 through m R is the amount at risk, which is the amount of funds to be paid out to the event organizer.

Although this disclosure describes calculating a fraud risk score using a particular algorithm, this disclosure contemplates calculating a fraud risk score using any suitable algorithm. Moreover, although this disclosure describes calculating a fraud risk score using particular variables that represent particular information, this disclosure contemplates calculating a fraud risk score using any suitable variables representing any suitable information.

In particular embodiments, fraud detection system 160 may evaluate an event listing for fraud at particular times. Fraud detection may be in real-time or post-facto. As an example and not by way of limitation, fraud detection system 160 may evaluate an event listing for fraud when the event listing is created by an event organizer. As another example and not by way of limitation, fraud detection system 160 may evaluate an event listing for fraud when the event organizer makes a request to pay out funds. As yet another example and not by way of limitation, fraud detection system 160 may evaluate an event listing for fraud periodically, such as one an hour, once a day, or another suitable period. Although this disclosure describes evaluation event listings at particular times, this disclosure contemplates evaluation event listings at any suitable times.

In particular embodiments, fraud detection system may evaluate a set of event listings for fraud in particular orders. Fraud detection system 160 may evaluate one or more event listings individually, in batches, in whole, or by other suitable amounts.

In particular embodiments, fraud detection system 160 may evaluate an event listing for fraud based on the event information associated with the event listing. Event information may include information describing the event date, type, cost, organizer, promoter, geographic location, venue, performer, attendees, and other suitable event information. Event information may also include information describing the event organizer, such as, for example, the event organizer's name, email, contact information, location, IP address, reputation, financial information, credit score, bank account number, payment history, and other suitable information about the event organizer. In particular embodiments, fraud detection system 160 may evaluate an event listing for fraud based on the location of the event. Events in particular locations or countries may be more likely to be fraudulent than events in other locations or countries. The location of an event may be inputted by an event organizer when he creates an event listing on event management system 170. As an example and not by way of limitation, events located in the United States or the European Union may have lower fraud risk scores than events located in various African nations or former Eastern Bloc countries that are known to be fraud risks. As another example and not by way of limitation, events located in unknown or imaginary locations may have higher fraud risk scores than events located in known locations. An event listing with a location of "Arvandor," which is a mythical location, may have a higher fraud risk score than an event listing with a location of "Golden Gate Park," which is a real location. In particular embodiments, fraud detection system 160 may evaluate an event listing for fraud based on the location of the event organizer of the event. Event organizers in particular locations or countries may be more likely to create fraudulent event listings than event organizers in other locations or countries. The location of an event organizer may be determined by querying the event organizer, from the event organizer's financial or personal information, by examining the IP address of the event organizer when he accesses event management system 170, or by other suitable methods. As an example and not by way of limitation, an event listing with an event organizer from Romania may have a higher fraud risk score than an event listing with an event organizer from the United States. As another example and not by way of limitation, an event listing with an event organizer in Rikers Island Prison Complex may have a higher fraud risk score than an event listing with an event organizer who is not in prison. In particular embodiments, fraud detection system 160 may evaluate an event listing for fraud based on the reputation of the event organizer. Event organizers who have previously created non-fraudulent event listings may be less likely to create fraudulent event listings in the future. Similarly, event organizers who have previously created fraudulent event listings may be more likely to create fraudulent event listings. Furthermore, new users 101 of event management system 170 may be more likely to create fraudulent event listings than users 101 with a history of using the system. As an example and not by way of limitation, an event listing with an event organizer who has a history of creating non-fraudulent event listings may have a lower fraud risk score than an event listing with an event organizer who has no history of creating event listings. In particular embodiments, fraud detection system 160 may evaluate an event listing for fraud based on the payment history of the event organizer. The payment history of an event organizer may include payment information for one or more event listings. The payment history of the event organizer may include the date, time, amount, and other suitable payment information regarding prior pay outs to the organizer. The payment history of the event organizer may also include the charge back rate on any ticket payments that were paid out to the organizer. Event organizers who have previously withdrawn funds may be less likely to create fraudulent event listings than event organizers who are withdrawing funds for the first time. Moreover, event organizer who have previously withdrawn funds and had low charge back rates are less likely to create fraudulent event listings. As an example and not by way of limitation, an event listing with an event organizer who has had funds paid out to him several times previously may have a lower fraud risk score than an event listing with an event organizer who has not yet been paid out any funds. As another example and not by way of limitation, an event listing with an event organizer who has sold tickets associated with credit card payments and experienced a 0% charge back rate may have a lower fraud risk score than an event listing with an event organizer who withdrew funds once previously and experienced a 50% charge back rate. Although this disclosure describes evaluating an event listing for fraud based on particular event information, this disclosure contemplates evaluating an event listing for fraud based on any suitable event information.

In particular embodiments, fraud detection system 160 may evaluate an event listing for fraud based on the payment information associated with the event listing. Payment information may include the address verification system code for the payments for the event, the credit cards used to pay for the event, the decline rate for the credit cards, the use ratio of the credit cards, the locations of payers, the IP addresses of the payers, the use ratio of the IP addresses, the number of prior payouts to the event organizer, the amount of prior payouts to the event organizer, and other suitable payment information. In particular embodiments, fraud detection system 160 may evaluate an event listing for fraud based on the address verification system codes (AVS codes) returned by the credit card processor for the payments for the event. When a user 101 purchases a ticket online using a credit card, a credit card processor may analyze the address information provided by the user 101 and compare it to the address of record for that credit card. The credit card processor may then determine that the address if a full match, a partial match, or a mismatch. Credit card charges that are full matches are less likely to be fraudulent than charges that are partial matches, which are less likely to be fraudulent than charges that are mismatches. Fraud detection system 160 may look at the AVS scores for all tickets purchased for an event listing. Event listings with worse AVS scores (i.e., more partial matches and mismatches) may have higher fraud risk scores. As an example and not by way of limitation, an event listing with an AVS score of 0.84 (which is a good score) may have a higher fraud risk score than an event listing with an AVS score of 0.99 (which is a poor score). In particular embodiments, fraud detection system 160 may evaluate an event listing for fraud based on the payment or credit card decline rate for the payments for the event. Credit cards that have been stolen are more likely to be declined. Fraud detection system 160 may access all of the credit card transactions associated with an event listing and calculate a credit card decline rate for the event listing. As an example and not by way of limitation, an event listing with an 8% decline rate may have a lower fraud risk score than an event listing with a 42% decline rate. In particular embodiments, fraud detection system 160 may evaluate an event listing for fraud based on the locations of the payers of the payments for the event. Payers in particular locations or countries may be more likely to make fraudulent payment (such as, for example, by using stolen credit cards) than payers in other locations or countries. The location of a payer may be determined by querying the payer, from the payer's financial or personal information, by examining the IP address of the payer when he accesses event management system 170, or by other suitable methods. As an example and not by way of limitation, an event listing with several payers from Indonesia, where credit card fraud may be rampant, may have a higher fraud risk score than an event listing with payers only from the United States. In particular embodiments, fraud detection system 160 may evaluate an event listing for fraud based on the credit cards used to pay for the event and the use ratio of the credit cards. Payers who use a credit card multiple times to buy tickets for an event may be more likely to be using a stolen credit card than payers who are only using their credit cards once per event. Fraud detection system 160 may access all the credit card transaction associated with an event listing, identify any credit cards that were used multiple time, and calculate a credit card use ratio for the event listing. As an example and not by way of limitation, an event listing with a credit card use ratio of 4.1 (i.e., each credit card was used an average of 4.1 times to purchase tickets for the event) may have a higher fraud risk score than an event listing with a credit card use ratio of 1.1. In particular embodiments, fraud detection system 160 may evaluate an event listing for fraud based on the IP addresses used to make payments for the event and the use ratio of the IP addresses. Payers who are using the same IP address for several ticket orders for an event may be more likely to be using a stolen credit card than payers who place a single ticket order from a single IP address. As an example and not by way of limitation, a payer with seven stolen credit cards may access event management system 170 from a client system 130, wherein the client system 130 has a particular IP address associated with it. The payer may then use each stolen credit card once to purchase one ticket for the event. However, the IP address associated with each purchase will be same. Consequently, multiple transactions coming from the same IP address may be more likely to be fraudulent. Fraud detection system 160 may access all the IP addresses associated with ticket purchases for an event listing, identify any IP addresses that were used multiple times, and calculate an IP address use ratio for the event listing. As an example and not by way of limitation, an event listing with an IP use ratio of 6.0 (i.e., each IP address was used an average of 6.0 times to purchase tickets for the event) may have a higher fraud risk score than an event listing with an IP address use ration of 1.2. In particular embodiments, fraud detection system 160 may evaluate an event listing for fraud based on the number of prior payouts to the event organizer of the event. An event listing with an event organizer who has previously withdrawn funds may be less likely to be fraudulent than an event listing with an event organizer who has yet to withdraw funds. As an example and not by way of limitation, an event listing with an event organizer who has had funds paid out to him several times previously may have a lower fraud risk score than an event listing with an event organizer who has not yet been paid out any funds. In particular embodiments, fraud detection system 160 may evaluate an event listing for fraud based on the amount of the prior payouts to the event organizer of the event. An event listing with an event organizer who has previously withdrawn a large amount of funds may be less likely to be fraudulent than an event listing with an event organizer who has withdrawn less funds. As an example and not by way of limitation, an event listing with an event organizer who has had $10,000 in funds paid out to him may have a lower fraud risk score than an event listing with an event organizer who has not yet has any funds paid out. Although this disclosure describes evaluating an event listing for fraud based on particular payment information, this disclosure contemplates evaluating an event listing for fraud based on any suitable payment information.

In particular embodiments, fraud detection system 160 may evaluate an event listing for fraud based on the amount of funds to be paid out to an event organizer. The amount of funds to be paid out may also be known as the amount "at risk." The amount at risk may be evaluated on an absolute basis or a percentile basis. Event management system 170 may automatically pay out some or all of the funds associated with an event listing at a specific time period. As an example and not by way of limitation, event management system 170 may pay out the current balance of funds associated with an event listing on a weekly basis to the event organizer. Alternatively, event management system 170 may receive a request to pay out some or all of the funds associated with an event listing to the event organizer. As an example and not by way of limitation, the event organizer may transmit a request to withdraw all funds collected from ticket sales for an event. As another example and not by way of limitation, the event organizer may transmit a request to withdraw a fraction of the funds collected from tickets sales for the event. An event listing with an event organizer requesting a pay out of a large amount of funds or a large fraction of funds available may be more likely to be fraudulent than an event listing with an event organizer requesting a pay out of less funds or a smaller fraction of funds available. As an example and not by way of limitation, an event listing with an event organizer who is requesting to withdraw $100,000 may have a higher fraud risk score than an event listing with an event organizer who is requesting to withdraw $100. Alternatively, an event listing with an event organizer requesting a pay out of a large amount of funds or a large fraction of funds available may not necessarily be more likely to be fraudulent, however the larger pay out request presents a higher risk to the operator of the event management system 170. In particular embodiments, fraud detection system 160 may evaluate an event listing based on the monetary risk posed by the amount of funds to be paid out to an event organizer. As an example, a request for $100,000 from a trusted event organizer may have the same fraud risk score as a request for $1000 from an unknown event organizer.

In particular embodiments, fraud detection system 160 may approve or deny pay out requests based on the fraud risk score of an event listing. As an example and not by way of limitation, fraud detection system 160 may receive a request to pay out funds to an event organizer. Fraud detection system 160 may then determine a fraud risk score for that event listing. If the fraud risk score for the event listing is greater than a threshold fraud risk score, then fraud detection system 160 may deny the request to pay out funds. For example, if the fraud risk score for the event listing is in the 98th percentile or higher, fraud detection system 160 may automatically deny the request to pay out funds. However, if the fraud risk score for the event is less than a threshold fraud risk score, then fraud detection system 160 may approve the request to pay out funds. Event management system 170 may then facilitate the transfer of the requested fund to the event organizer.

In particular embodiments, fraud detection system 160 may perform a variety of actions to counter improper activities once an event listing has been found fraudulent. As an example and not by way of limitation, fraud detection system 160 may deactivate the event management account associated with the event organizer who created a fraudulent event listing. As another example and not by way of limitation, fraud detection system 160 may stop ticket sales for an event associated with a fraudulent event listing.

In particular embodiments, fraud detection system 160 may display the results of its evaluation of an event listing for fraud. As an example and not by way of limitation, fraud detection system 160 may calculate a fraud risk score for a particular event listing and transmit that score to a client system 130, where it can be viewed by a user. As another example and not by way of limitation, fraud detection system 160 may transmit a fraud risk score to event management system, where it can be viewed by a system administrator. As yet another example and not by way of limitation, fraud detection system 160 may transmit a fraud risk score to relevant law enforcement authorities. Although this disclosure describes displaying the evaluation of an event listing for fraud on particular systems, this disclosure contemplates displaying the evaluation of an event listing for fraud on any suitable system. As an example and not by way of limitation, the calculation of a fraud risk score may be displayed on client system 130, fraud detection system 160, event management system 170, another suitable system, or two or more such systems.

Figure 2:
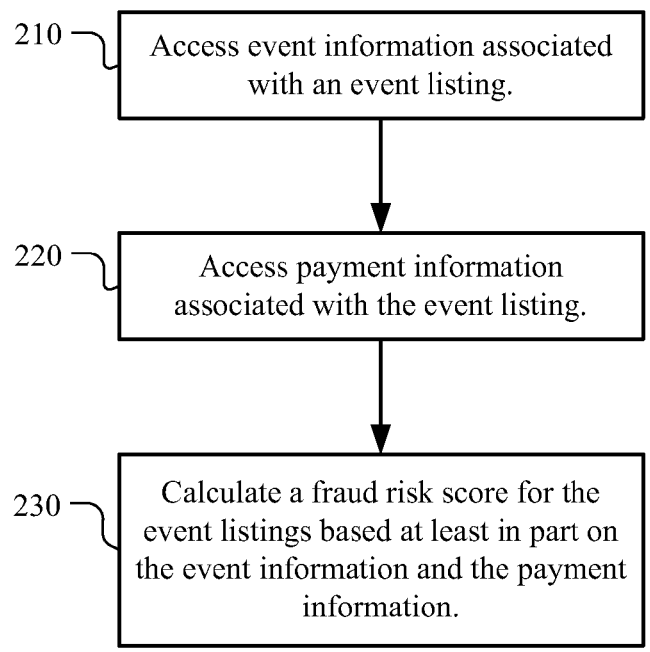
FIG. 2 illustrates an example method for evaluating event listings for fraud.

FIG. 2 illustrates an example method 200 for evaluating event listings for fraud. The method begins at step 210, where fraud detection system 160 accesses event information associated with an event listing. The event listing corresponds to a particular event. At step 220, fraud detection system 160 accesses payment information associated with the event listing. At step 230, fraud detection system 160 calculates a fraud risk score for the event listing based at least in part on the event information and the payment information. At step 230, to calculate the fraud risk score, fraud detection system 160 may first calculate an event quality score based on the event information and a payment quality score based on the payment information, and then fraud detection system 160 may calculate a fraud risk score based at least in part on the event quality score and the payment quality score. At step 230, fraud detection system 160 may also access an amount of funds requested to be paid out to an event organizer and calculate the fraud risk score further based at least in part on the amount of funds requested to be paid out to the event organizer. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components carrying out particular steps of the method of FIG. 2, this disclosure contemplates any suitable combination of any suitable components carrying out any suitable steps of the method of FIG. 2.

Systems and Methods

Figure 3:
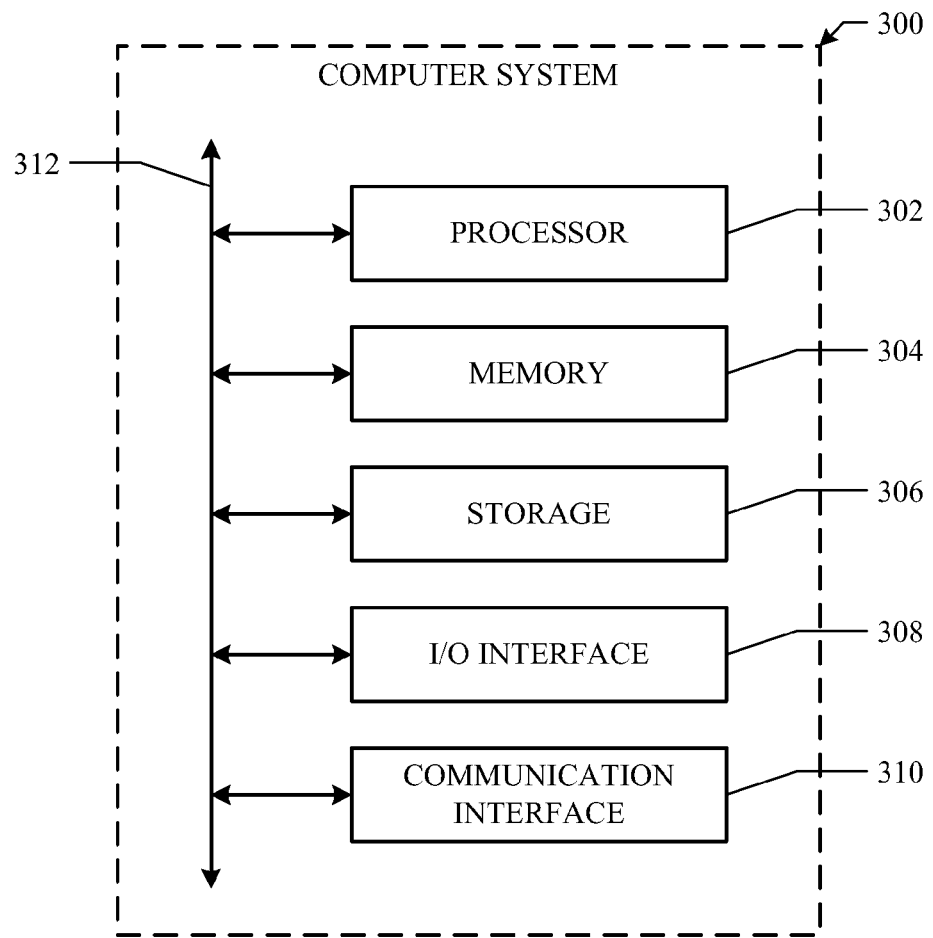
FIG. 3 illustrates an example computer system.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include an HDD, a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 302 (such as, for example, one or more internal registers or caches), one or more portions of memory 304, one or more portions of storage 306, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

Figure 4:
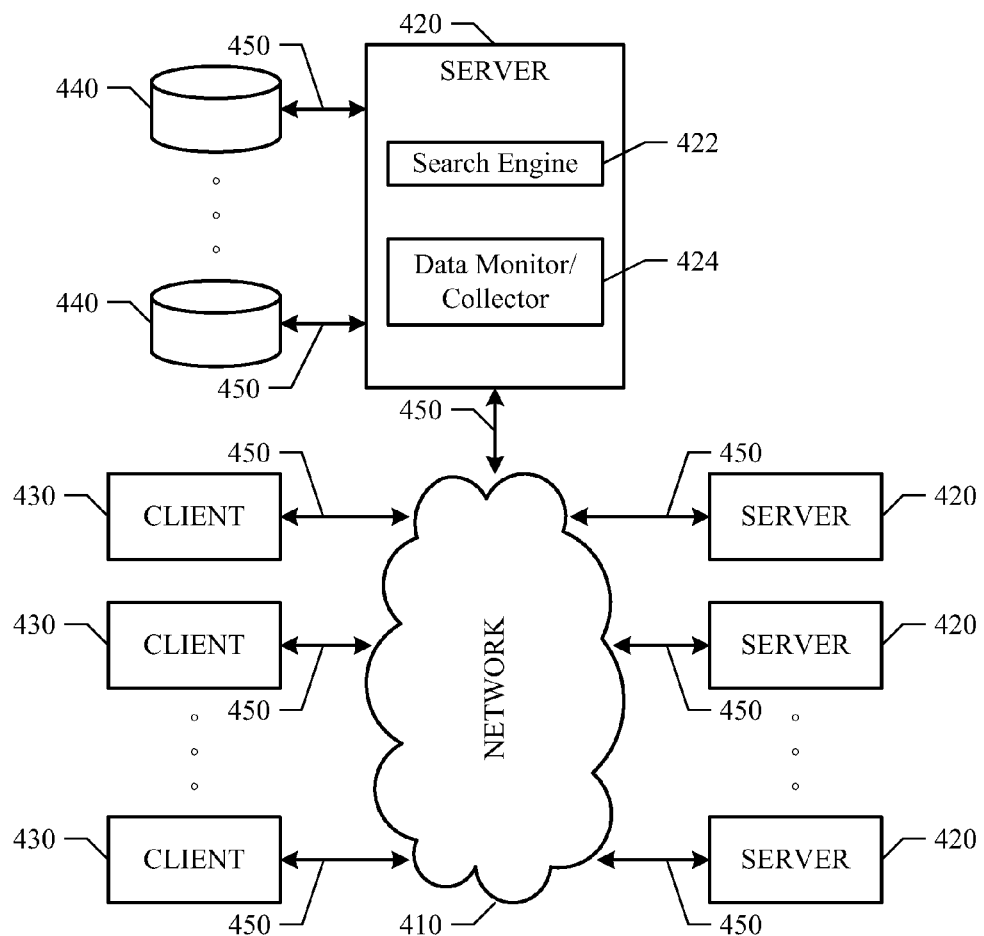
FIG. 4 illustrates an example network environment.

FIG. 4 illustrates an example network environment 400. This disclosure contemplates any suitable network environment 400. As an example and not by way of limitation, although this disclosure describes and illustrates a network environment 400 that implements a client-server model, this disclosure contemplates one or more portions of a network environment 400 being peer-to-peer, where appropriate. Particular embodiments may operate in whole or in part in one or more network environments 400. In particular embodiments, one or more elements of network environment 400 provide functionality described or illustrated herein. Particular embodiments include one or more portions of network environment 400. Network environment 400 includes a network 410 coupling one or more servers 420 and one or more clients 430 to each other. This disclosure contemplates any suitable network 410. As an example and not by way of limitation, one or more portions of network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 410 may include one or more networks 410.

Links 450 couple servers 420 and clients 430 to network 410 or to each other. This disclosure contemplates any suitable links 450. As an example and not by way of limitation, one or more links 450 each include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) links 450. In particular embodiments, one or more links 450 each includes an intranet, an extranet, a VPN, a LAN, a WLAN, a WAN, a MAN, a communications network, a satellite network, a portion of the Internet, or another link 450 or a combination of two or more such links 450. Links 450 need not necessarily be the same throughout network environment 400. One or more first links 450 may differ in one or more respects from one or more second links 450.

This disclosure contemplates any suitable servers 420. As an example and not by way of limitation, one or more servers 420 may each include one or more advertising servers, applications servers, catalog servers, communications servers, database servers, exchange servers, fax servers, file servers, game servers, home servers, mail servers, message servers, news servers, name or DNS servers, print servers, proxy servers, sound servers, standalone servers, web servers, or web-feed servers. In particular embodiments, a server 420 includes hardware, software, or both for providing the functionality of server 420. As an example and not by way of limitation, a server 420 that operates as a web server may be capable of hosting websites containing web pages or elements of web pages and include appropriate hardware, software, or both for doing so. In particular embodiments, a web server may host HTML or other suitable files or dynamically create or constitute files for web pages on request. In response to a Hyper Text Transfer Protocol (HTTP) or other request from a client 430, the web server may communicate one or more such files to client 430. As another example, a server 420 that operates as a mail server may be capable of providing e-mail services to one or more clients 430. As another example, a server 420 that operates as a database server may be capable of providing an interface for interacting with one or more data stores (such as, for example, data stores 440 described below). Where appropriate, a server 420 may include one or more servers 420; be unitary or distributed; span multiple locations; span multiple machines; span multiple datacenters; or reside in a cloud, which may include one or more cloud components in one or more networks.

In particular embodiments, one or more links 450 may couple a server 420 to one or more data stores 440. A data store 440 may store any suitable information, and the contents of a data store 440 may be organized in any suitable manner. As an example and not by way or limitation, the contents of a data store 440 may be stored as a dimensional, flat, hierarchical, network, object-oriented, relational, XML, or other suitable database or a combination or two or more of these. A data store 440 (or a server 420 coupled to it) may include a database-management system or other hardware or software for managing the contents of data store 440. The database-management system may perform read and write operations, delete or erase data, perform data deduplication, query or search the contents of data store 440, or provide other access to data store 440.

In particular embodiments, one or more servers 420 may each include one or more search engines 422. A search engine 422 may include hardware, software, or both for providing the functionality of search engine 422. As an example and not by way of limitation, a search engine 422 may implement one or more search algorithms to identify network resources in response to search queries received at search engine 422, one or more ranking algorithms to rank identified network resources, or one or more summarization algorithms to summarize identified network resources. In particular embodiments, a ranking algorithm implemented by a search engine 422 may use a machine-learned ranking formula, which the ranking algorithm may obtain automatically from a set of training data constructed from pairs of search queries and selected Uniform Resource Locators (URLs), where appropriate.

In particular embodiments, one or more servers 420 may each include one or more data monitors/collectors 424. A data monitor/collection 424 may include hardware, software, or both for providing the functionality of data collector/collector 424. As an example and not by way of limitation, a data monitor/collector 424 at a server 420 may monitor and collect network-traffic data at server 420 and store the network-traffic data in one or more data stores 440. In particular embodiments, server 420 or another device may extract pairs of search queries and selected URLs from the network-traffic data, where appropriate.

This disclosure contemplates any suitable clients 430. A client 430 may enable a user at client 430 to access or otherwise communicate with network 410, servers 420, or other clients 430. As an example and not by way of limitation, a client 430 may have a web browser, such as MICROSOFT INTERNET EXPLORER or MOZILLA FIREFOX, and may have one or more add-ons, plug-ins, or other extensions, such as GOOGLE TOOLBAR or YAHOO TOOLBAR. A client 430 may be an electronic device including hardware, software, or both for providing the functionality of client 430. As an example and not by way of limitation, a client 430 may, where appropriate, be an embedded computer system, an SOC, an SBC (such as, for example, a COM or SOM), a desktop computer system, a laptop or notebook computer system, an interactive kiosk, a mainframe, a mesh of computer systems, a mobile telephone, a PDA, a netbook computer system, a server, a tablet computer system, or a combination of two or more of these. Where appropriate, a client 430 may include one or more clients 430; be unitary or distributed; span multiple locations; span multiple machines; span multiple datacenters; or reside in a cloud, which may include one or more cloud components in one or more networks.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Furthermore, "a", "an," or "the" is intended to mean "one or more," unless expressly indicated otherwise or indicated otherwise by context. Therefore, herein, "an A" or "the A" means "one or more A," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, this disclosure encompasses any suitable combination of one or more features from any example embodiment with one or more features of any other example embodiment herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more processors associated with one or more computing devices:
    accessing, by one or more of the processors, event information associated with an event listing corresponding to an event, wherein the event listing is hosted on an online event management system, and wherein the event listing facilitates registration of attendees for the event, and wherein the event information identifies one or more of:
        a location of the event;
        a location of an event organizer of the event;
        a reputation of the event organizer; or
        a payment history of the event organizer;
    accessing, by one or more of the processors, payment information associated with the event listing; and
    calculating, by one or more of the processors, a fraud risk score for the event listing based at least in part on the payment information and one or more of the location of the event, the location of the event organizer of the event, the reputation of the event organizer, or the payment history of the event organizer.

2. The method of claim 1, wherein calculating the fraud risk score for the event listing based at least in part on the event information and the payment information comprises:
calculating, by one or more of the processors, an event quality score based on the event information;
calculating, by one or more of the processors, a payment quality score based on the payment information; and
calculating, by one or more of the processors, the fraud risk score based at least in part on the event quality score and the payment quality score.

3. The method of claim 2, wherein calculating the fraud risk score based at least in part on the event quality score and the payment quality score comprises:
calculating, by one or more of the processors, a deviation of the event information from a typical event information;
calculating, by one or more of the processors, a deviation of the payment information from a typical event information; and
calculating, by one or more of the processors, the fraud risk score based at least in part on the deviation of the event information and the deviation of the payment information.

4. The method of claim 1, further comprising:
receiving, by one or more of the processors, a request to pay out funds to an event organizer of the event; and
wherein calculating the fraud risk score is further based at least in part on an amount of funds requested in the request to pay out funds.

5. The method of claim 4, further comprising:
if the fraud risk score is greater than a threshold fraud risk score, then denying, by one or more of the processors, the request to pay out funds;
else, approving, by one or more of the processors, the request to pay out funds.

6. The method of claim 1, wherein:
the payment information identifies one or more of:
an address verification system code for one or more payments for the event;
a credit card decline rate for the one or more payments;
a location of the one or more payers of the one or more payments;
a credit card use ratio for the one or more payments;
an IP-address use rate for the one or more payments;
a number of prior payouts to an event organizer of the event; or
an amount of each prior payout to the event organizer; and
calculating the fraud risk score is further based at least in part on one or more of:
the address verification system code for one or more payments for the event;
the credit card decline rate for the one or more payments;
the location of the one or more payers of the one or more payments;
the credit card use ratio for the one or more payments;
the IP-address use rate for the one or more payments;
the number of prior payouts to an event organizer of the event; or
the amount of each prior payout to the event organizer.

7. The method of claim 1, wherein the fraud risk score for the event listing is a percentile rank equal to the percentage of event listings that have a fraud risk score the same or lower than the event listing.

8. The method of claim 1, further comprising displaying, by one or more of the processors, the fraud risk score to a user.

9. An apparatus comprising: one or more processors; and a memory coupled to the processors comprising instructions executable by the processors, the processors operable when executing the instructions to:
access event information associated with an event listing corresponding to an event, wherein the event listing is hosted on an online event management system, and wherein the event listing facilitates registration of attendees for the event, and wherein the event information identifies one or more of:
a location of the event;
a location of an event organizer of the event;
a reputation of the event organizer; or
a payment history of the event organizer;
access payment information associated with the event listing; and
calculate a fraud risk score for the event listing based at least in part on the payment information and one or more of the location of the event, the location of the event organizer of the event, the reputation of the event organizer, or the payment history of the event organizer.

10. The apparatus of claim 9, wherein the instruction to calculate the fraud risk score for the event listing based at least in part on the event information and the payment information comprises instructions to:
calculate an event quality score based on the event information;
calculate a payment quality score based on the payment information; and
calculate the fraud risk score based at least in part on the event quality score and the payment quality score.

11. The apparatus of claim 10, wherein the instruction to calculate the fraud risk score based at least in part on the event quality score and the payment quality score comprises instructions to:
calculate a deviation of the event information from a typical event information;
calculate a deviation of the payment information from a typical event information; and
calculate the fraud risk score based at least in part on the deviation of the event information and the deviation of the payment information.

12. The apparatus of claim 9, wherein the processors are further operable when executing the instructions to:
receive a request to pay out funds to an event organizer of the event; and
wherein to calculate the fraud risk score is further based at least in part on an amount of funds requested in the request to pay out funds.

13. The apparatus of claim 12, wherein the processors are further operable when executing the instructions to:
if the fraud risk score is greater than a threshold fraud risk score, then deny the request to pay out funds;
else, approve the request to pay out funds.

14. The apparatus of claim 9, wherein:
the payment information identifies one or more of:
an address verification system code for one or more payments for the event;
a credit card decline rate for the one or more payments;
a location of the one or more payers of the one or more payments;
a credit card use ratio for the one or more payments;
an IP-address use rate for the one or more payments;
a number of prior payouts to an event organizer of the event; or
an amount of each prior payout to the event organizer; and to calculate the fraud risk score is further based at least in part on one or more of:

the address verification system code for one or more payments for the event;

the credit card decline rate for the one or more payments;

the location of the one or more payers of the one or more payments;

the credit card use ratio for the one or more payments;

the IP-address use rate for the one or more payments;

the number of prior payouts to an event organizer of the event; or the amount of each prior payout to the event organizer.

15. The apparatus of claim 9, wherein the fraud risk score for the event listing is a percentile rank equal to the percentage of event listings that have a fraud risk score the same or lower than the event listing.

16. The apparatus of claim 9, wherein the processors are further operable when executing the instructions to display the fraud risk score to a user.

17. One or more computer-readable non-transitory storage media embodying instructions that are operable when executed to:

access event information associated with an event listing corresponding to an event, wherein the event listing is hosted on an online event management system, and wherein the event listing facilitates registration of attendees for the event, and wherein the event information identifies one or more of:

a location of the event;

a location of an event organizer of the event;

a reputation of the event organizer; or a payment history of the event organizer;

access payment information associated with the event listing; and calculate a fraud risk score for the event listing based at least in part on the payment information and one or more of the location of the event, the location of the event organizer of the event, the reputation of the event organizer, or the payment history of the event organizer.

* * * * *